(12) United States Patent
Breingan et al.

(10) Patent No.: US 9,694,436 B2
(45) Date of Patent: Jul. 4, 2017

(54) SYSTEM AND METHOD FOR FLUX COAT, REFLOW AND CLEAN

(71) Applicant: VEECO PRECISION SURFACE PROCESSING LLC, Horsham, PA (US)

(72) Inventors: William Gilbert Breingan, Media, PA (US); Lev Rapoport, Yardley, PA (US); John Clark, Philadelphia, PA (US); John Taddei, Breinigsville, PA (US); Laura Mauer, South Kent, CT (US)

(73) Assignee: VEECO PRECISION SURFACE PROCESSING LLC, Horsham, PA (US)

( * ) Notice: Subject to any disclaimer, the term of this patent is extended or adjusted under 35 U.S.C. 154(b) by 171 days.

(21) Appl. No.: 14/531,699

(22) Filed: Nov. 3, 2014

(65) Prior Publication Data

US 2015/0122876 A1    May 7, 2015

Related U.S. Application Data

(60) Provisional application No. 61/899,644, filed on Nov. 4, 2013.

(51) Int. Cl.
| | |
|---|---|
| B23K 1/00 | (2006.01) |
| B23K 37/04 | (2006.01) |
| B23K 1/20 | (2006.01) |
| B23K 3/08 | (2006.01) |
| B23K 1/008 | (2006.01) |
| B23K 101/42 | (2006.01) |

(52) U.S. Cl.
CPC .............. *B23K 1/203* (2013.01); *B23K 1/008* (2013.01); *B23K 1/0016* (2013.01); *B23K 1/206* (2013.01); *B23K 3/082* (2013.01); *B23K 3/085* (2013.01); *B23K 2201/42* (2013.01)

(58) Field of Classification Search
CPC ..... H01L 24/741; H01L 24/75; H01L 24/799; H01L 24/80; H01L 24/98; H01L 2224/749; H01L 2224/7501; H01L 2224/7999; H01L 2224/80012; H01L 2224/80912; H01L 2224/98; B23K 3/029
See application file for complete search history.

(56) References Cited

U.S. PATENT DOCUMENTS

| | | | | |
|---|---|---|---|---|
| 5,091,217 | A | * | 2/1992 | Hey ..................... C23C 16/455 118/719 |
| 5,338,362 | A | * | 8/1994 | Imahashi ................ C23C 16/54 118/719 |
| 5,855,465 | A | * | 1/1999 | Boitnott ............ H01L 21/67745 204/298.25 |

(Continued)

*Primary Examiner* — Erin Saad
*Assistant Examiner* — Carlos Gamino
(74) *Attorney, Agent, or Firm* — Leason Ellis LLP (57) ABSTRACT

The use of lead-free solder (flux) in Wafer Level Packaging applications requires more control of the temperature and environment during the reflow process. The flux needs to be applied by spin coating, reflowed in a controlled environment and then removed with a cleaning process. Incorporating these three processes in one compact system provides an efficient and economical solution. The unique design of the reflow oven consists of multiple hotplates and one cold plate, arranged in a circle to allow wafers to proceed through the oven in a rotary fashion.

17 Claims, 6 Drawing Sheets

(56) References Cited

U.S. PATENT DOCUMENTS

| | | | | |
|---|---|---|---|---|
| 5,902,088 A * | 5/1999 | Fairbairn | ........ | H01L 21/67201 118/719 |
| 6,143,082 A * | 11/2000 | McInerney | ........ | C23C 16/4412 118/719 |
| 6,174,377 B1 * | 1/2001 | Doering | ........ | C23C 16/44 118/715 |
| 6,287,386 B1 * | 9/2001 | Perlov | ........ | H01L 21/67126 118/719 |
| 6,576,062 B2 * | 6/2003 | Matsuse | ........ | C23C 16/45519 118/719 |
| 6,635,115 B1 * | 10/2003 | Fairbairn | ........ | H01L 21/67201 118/715 |
| 6,827,789 B2 * | 12/2004 | Lee | ........ | H01L 21/6719 118/719 |
| 6,884,299 B2 * | 4/2005 | Chang | ........ | C23C 14/568 118/719 |
| 7,153,542 B2 * | 12/2006 | Nguyen | ........ | H01L 21/67173 118/719 |
| 7,516,833 B2 * | 4/2009 | Todaka | ........ | H01L 21/6719 118/729 |
| 7,682,454 B2 * | 3/2010 | Sneh | ........ | C23C 14/566 118/719 |
| 7,812,285 B2 * | 10/2010 | Hayashi | ........ | F27B 5/04 118/724 |
| 8,043,432 B2 * | 10/2011 | Dip | ........ | C23C 16/45508 118/719 |
| 8,137,465 B1 * | 3/2012 | Shrinivasan | ........ | C23C 16/56 118/719 |
| 8,187,679 B2 * | 5/2012 | Dickey | ........ | C23C 16/452 427/569 |
| 8,277,161 B2 * | 10/2012 | Aburatani | ........ | H01L 21/67109 414/217 |
| 8,715,418 B2 * | 5/2014 | Chen | ........ | H01L 21/6719 118/719 |
| 8,845,857 B2 * | 9/2014 | Ohizumi | ........ | C23C 16/45546 118/728 |
| 8,888,919 B2 * | 11/2014 | Mitrovic | ........ | C23C 16/4585 118/715 |
| 9,511,438 B2 * | 12/2016 | Sato | ........ | B23K 3/0623 |
| 2004/0187784 A1 * | 9/2004 | Sferlazzo | ........ | C23C 16/45508 118/719 |
| 2005/0084610 A1 * | 4/2005 | Selitser | ........ | C23C 16/45551 427/248.1 |
| 2007/0218702 A1 * | 9/2007 | Shimizu | ........ | C23C 16/06 438/758 |
| 2009/0014126 A1 * | 1/2009 | Ohtani | ........ | B08B 3/00 156/345.24 |
| 2015/0034699 A1 * | 2/2015 | Zhang | ........ | H01L 21/67109 228/47.1 |
| 2015/0034700 A1 * | 2/2015 | Zhang | ........ | B23K 1/0016 228/49.5 |

* cited by examiner

SYSTEM AND METHOD FOR FLUX COAT, REFLOW AND CLEAN

CROSS REFERENCE TO RELATED APPLICATIONS

The present application claims the benefit of U.S. Provisional Patent Application Ser. No. 61/899,644, filed Nov. 4, 2013, which is hereby incorporated by reference in its entirety.

TECHNICAL FIELD

The present invention relates to an apparatus/system and method for coating flux materials onto a substrate with solder bumps, heating with a specified temperature profile in a controlled, low oxygen environment to reflow the solder, and finally remove all of the flux and clean the substrate.

BACKGROUND

Wafer level packaging (WLP) is being used extensively for IC packaging. In WLP the die and package are processed and tested on the wafer, prior to singulation. As part of this wafer level process, wafer bumping involves using solder bumps for interconnections and the electromechanical interface for the device. The reflow process is used to form a metallic interconnect phase between the under-bump metal (UBM) and solder. After the solder is deposited on the wafer, the reflow process is used to form homogeneous solder spheres. The prevention of solder oxides during reflow is essential for strength of the interconnection.

The prevention of oxide formation during reflow can be accomplished in numerous ways. Currently the most common approach is to coat the wafer with flux prior to reflow. The coated wafer is then reflowed in a nitrogen atmosphere that further discourages the formation of solder oxides. Time, temperature and atmosphere are critical parameters for proper flux (solder) reflow.

Recently the use of copper pillar microbumps, instead of standard solder bumps, are being used for flip-chip devices to provide further miniaturization in the structure. The process used to form these copper pillar microbumps may leave oxides and hydroxides on the surface of the solder. Gas based processes combined with reflow can be used to clean some metal surfaces, however in many instances a purely gas-based process is unable to remove trace organics left inside the bump. For this reason, spin-coating semiconductor grade fluxes are being used to reform misshapen, uneven, oxide-bearing solder into uniform, coplanar solder microbumps. It is critical for the flux to completely and uniformly coat the top of the solder bump before it enters the reflow process.

The reflow temperature profile is critical for the process to succeed. The wafer must be exposed to the maximum temperature for only the shortest effective period during its time in each temperature zone. The overall profile contains four phases: preheat, pre-reflow, reflow and cooling.

Lead-free solders require higher process temperatures. Reduction in solder paste volumes require narrower process windows to optimize the reflow profile.

Low oxygen levels (<50 ppm) are critical to successful reflow since the presence of oxygen causes oxidation to the joins resulting in bad solder joint reliability.

Figure 1:
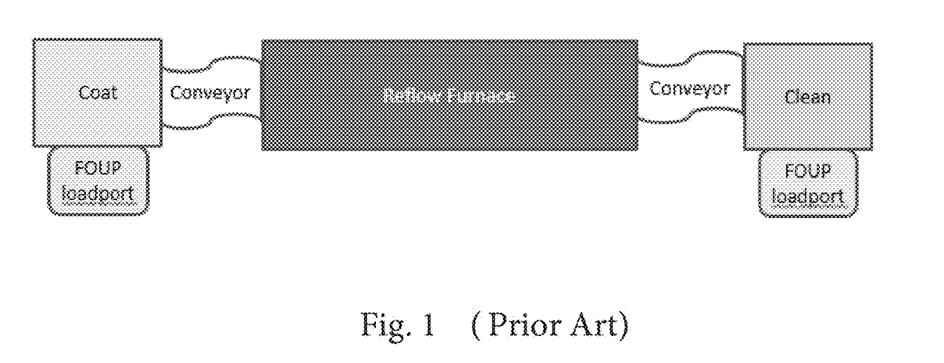
FIG. 1 is a schematic of a conventional system for separately performing coat/reflow/clean processes using separate pieces of equipment.

Currently the solder reflow process is done in separate pieces of equipment to coat, reflow and clean. This equipment takes up a large amount of expensive floor space in the semiconductor fab. FIG. 1 shows a conventional system that is made up of multiple pieces of equipment.

SUMMARY

The present invention includes a system and method for coating flux materials onto a substrate (wafer) with solder bumps, heating with a specified temperature profile in a controlled, low oxygen environment to reflow the solder, and finally removing all of the flux and clean the substrate. The entire process is done within one system that incorporates the above mentioned three processes within one unit to save floor space and provide a controlled, clean environment for the wafers.

The reflow is performed by a reflow device (solder reflow oven) heats and then cools a semiconductor wafer within a controlled low oxygen environment. The oven consists of a number of hot plates and one cold plate all arranged in a circle to allow wafers to proceed through the oven in a rotary fashion. Multiple wafers can be processed at once with one per hot or cold plate. The wafers are held by supports which extend from the center of the circle of hot/cold plates. These supports move as a unit to lift the wafers off of the plates, index each wafer to the next plate, and then lower the wafers back down onto the plates. By controlling the temperature of each hot plate and the dwell time a desired heating profile can be achieved.

The entire device is enclosed such that nitrogen can be blown in as a purge gas to lower the oxygen concentration to a desired level. Gases exit the device through a narrow exhaust which flows at high speed. This high flow speed reduces the amount of oxygen which is able to diffuse into the chamber through the exhaust.

Wafers enter and exit the device through a door located on the periphery of the device next to the cold plate. Two shutters serve to separate the portion of the device containing the cold plate from the rest so that the low oxygen atmosphere within the device is not disturbed when the door is opened to add or remove a wafer. With the shutters still closed, this portion of the enclosure is purged back to the target oxygen concentration. Once that target has been reached, the shutters are opened again allowing the wafers to be rotated. Thus the heated wafers are always protected from oxygen.

DETAILED DESCRIPTION OF CERTAIN EMBODIMENTS

FIG. 1 is a schematic of a conventional system (prior art) for separately performing coat/reflow/clean processes using separate pieces of equipment as shown.

FIGS. 2-8 illustrate a system 100 in accordance with one embodiment of the present invention for coating flux materials onto a substrate (e.g., wafer) with solder bumps, heating with a specified temperature profile in a controlled, low oxygen environment to reflow the solder, and finally remove all of the flux and clean the substrate (wafer).

Figure 2:
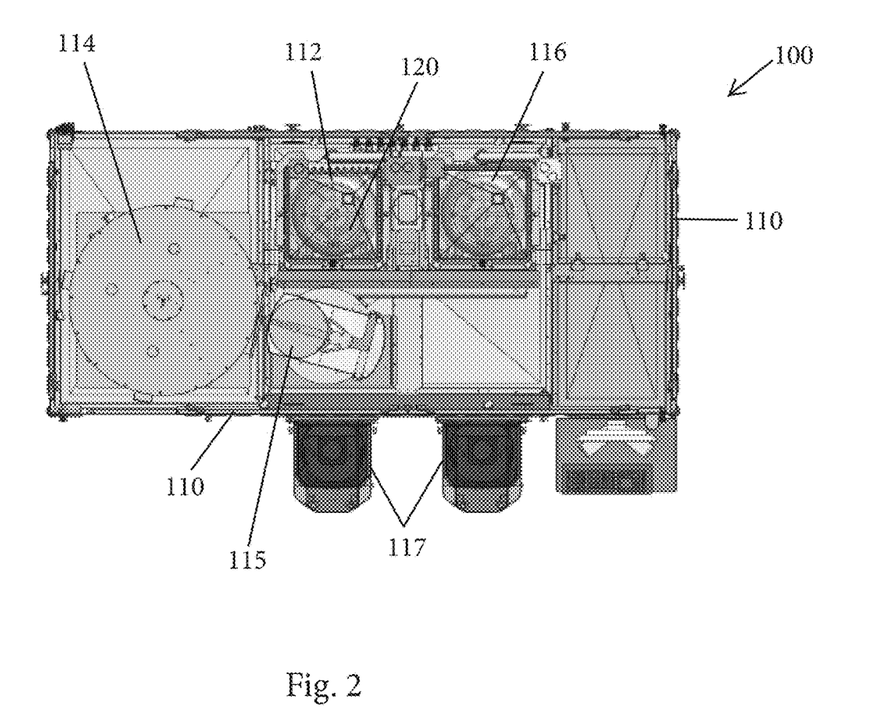
FIG. 2 is a top plan view of a system in accordance with one embodiment of the present invention for performing coat/reflow/clean processes as part of a single structure.
Figure 3:
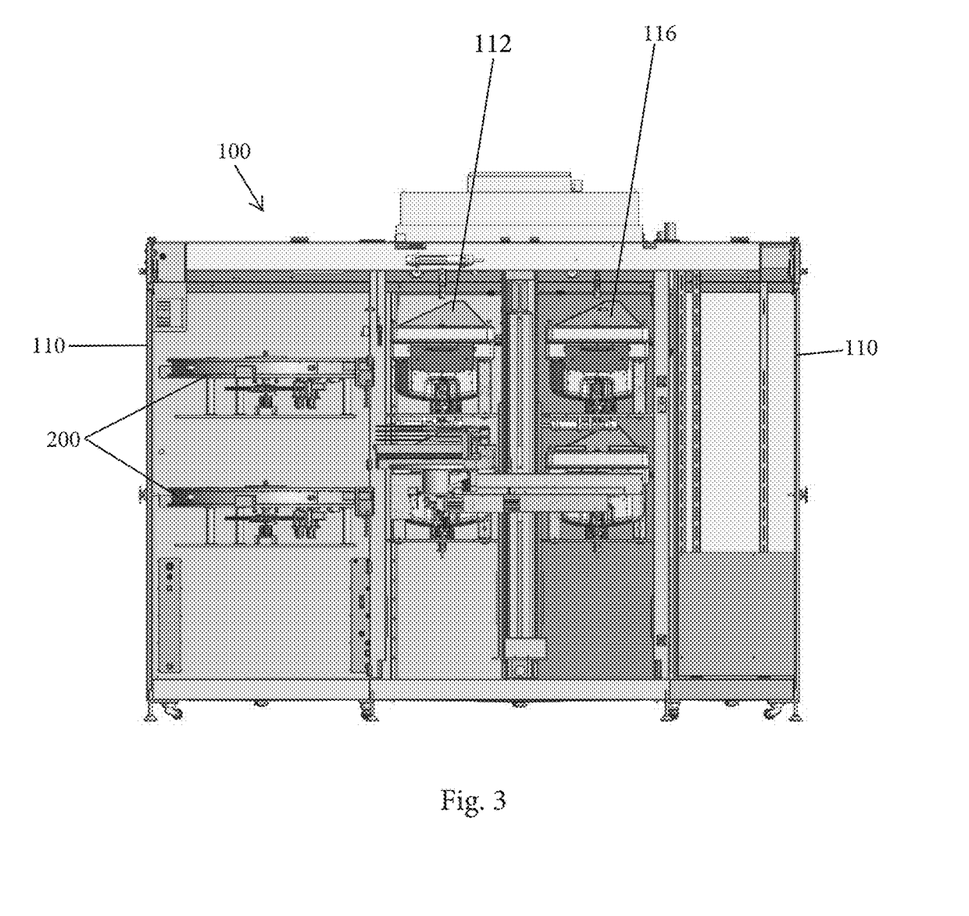
FIG. 3 is a side elevation view of the system of FIG. 2.

The system 100 is configured to perform three process functions within an overall equipment frame 110 of the system 100. These three modules are: (1) coat; (2) reflow; and (3) clean. For higher throughput, multiple modules of each type can be included within the system frame 110 as shown in FIGS. 2 and 3 and described in more detail below. The frame 110 of the system 100 defines a housing for containing the various components and stations (e.g., coat/reflow/clean) that make up the system 100. In the illustrated embodiments, the frame 110 is formed of a number of vertical and horizontal frame members that are connected one another to form a frame that supports the other components. The frame 110 has a number of access locations to permit wafer loading and unloading and other operations to be performed. As illustrated, the space defined by the frame 110 is partitioned into and defines a number of different stations. For example, there can be one station for each of the above modules, namely, a first station 112 at which a coating operation is performed; a second station 114 at which a reflow operation is performed, and a third station 116 at which a cleaning operation is performed.

The system 100 of the present invention is preferably an automated system or at least partially automates to allow each wafer to be moved in automated manner between the various stations. Any number of different transporting mechanisms can be used to controllably move the wafer between stations. For example, a robot 115 or the like can be used and is specifically configured to hold a wafer and move the wafer between stations. The robot 115 is thus centrally located such that it can easily access all of the stations.

The system 100 can also include other conventional load mechanism to allow a wafer to be introduced into the system and in particular, to one of the stations. For example, one or more FOUP load ports 117 can be used. As is known, FOUP is an acronym for Front Opening Unified Pod or Front Opening Universal Pod and is a specialized enclosure designed to hold silicon wafers securely and safely in a controlled environment, and to allow the wafers to be removed for processing or measurement by tools equipped with appropriate load ports and robotic handling systems. The one or more load ports 117 thus allow the wafers to be easily introduced into and removed from the system 100.

As shown in FIGS. 2 and 3, the system 100 can be designed such that there are multiple pieces of equipment at each of or at least at some of the stations. In particular, FIGS. 2 and 3 show an embodiment in which there are two FOUP load ports 117, two independent pieces of equipment at the first station 112 for coating the wafer, two independent pieces of equipment at the second station 114 for performing reflow operations; and two independent pieces of equipment at the third station 116 for cleaning the wafers. The pieces of equipment are arranged in a stacked manner so as to define two rows (an upper row and lower row) in FIG. 3; however, there is merely one configuration and others are possible. There is a single robot 115 (FIG. 2) which can be programmed to move wafers between the layers of devices in that in the illustrated embodiment, it is permissible that a wafer being moved between equipment in the lower row and equipment in the upper row or vice versa.

The frame 110 can also include components that make the frame 110 portable in nature to allow movement thereof. The frame can also support a host computer and various controllers, motors, and the like.

The coating of the flux at the first station 112 can be done by spin coating. A standard SSEC spin coating module 120 is preferably used. It should be noted that spray coating can also be done. For the spin coating process, a controlled volume of flux is dispensed on the wafer at an initial speed of 30 rpm. Once the dispensing is completed, the spin speed is increased to a speed dependent upon the thickness of flux desired. Spin speeds can range from about 300-1000 rpm for times of about 10-60 seconds.

After the flux is coated onto the wafer, it is transferred to the reflow station 114.

The reflow of the solder with flux is done in the reflow station 114. The reflow station is shown in FIGS. 2-8. One preferred embodiment of solder reflow device (a solder reflow oven) 200 that is located at the second station 114 includes at least one cold plate and one or more hot plates which cooperate with one another to ensure the reflow of the flux as described herein by controlled heating and then cooling of the substrate. In the illustrated embodiment, the solder reflow device 200 is in the form of a solder reflow oven that has a single cold plate 300 and three hot plates 310; however, as mentioned, the number of hot plates 310 can easily be more or less than three hot plates 310.

For the purposes of description, we will follow a single wafer through the device 200 describing the operation in the order of the processing.

Figure 4:
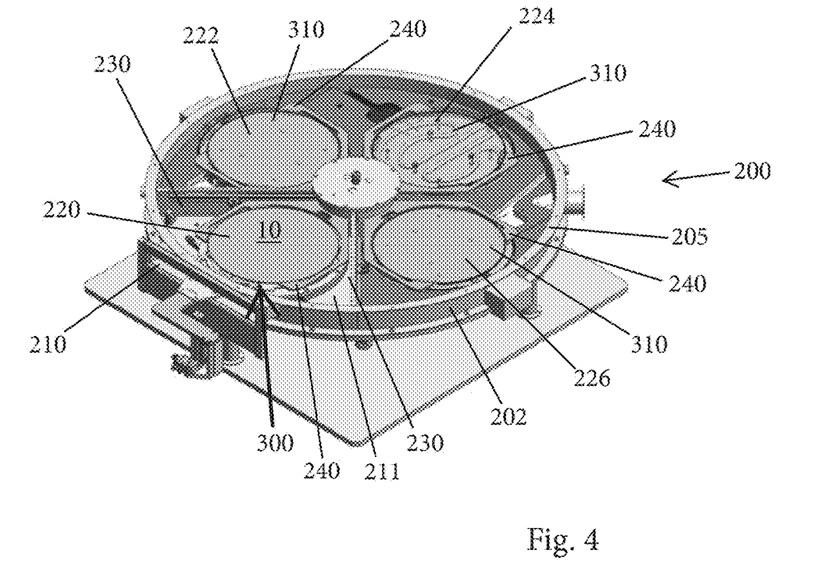
FIG. 4 is a top and side perspective view of a flux reflow station that is part of the system of FIGS. 2-3 and with a cover removed therefrom.
Figure 5:
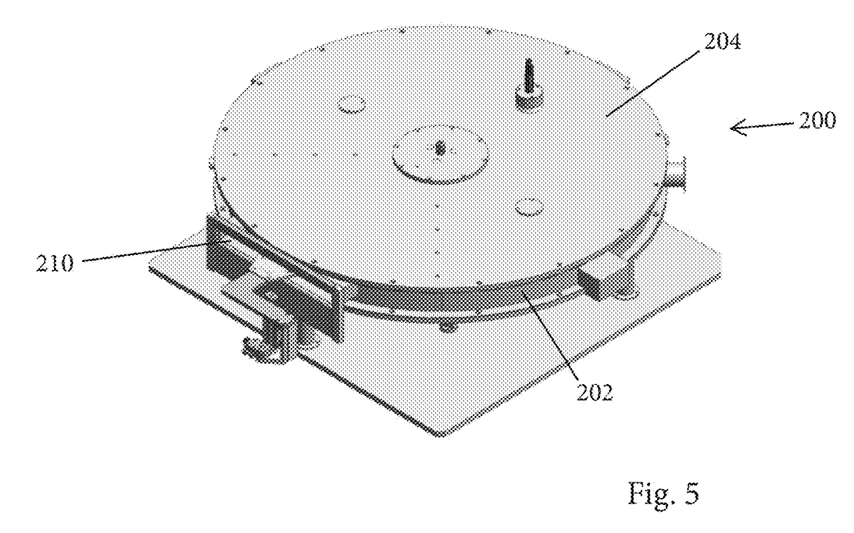
FIG. 5 is a top and side perspective view of the flux reflow station with the cover in place.

The device 200 is best shown in FIGS. 4 and 5 and includes a base portion 202 and a cover 204 that is removed in FIG. 4 to show the internal components of the device 200. As will be described herein, the device 200 is an indexed apparatus that is operatively connected to a controller that controls the indexed movement of the device 200. The device 200 can thus be part of a computer implemented system and as described herein, the movement of the device 200 is a result of a controlled motor or the like that rotates the device 200 between the various positions described below. The device 200 can thus be in the form of a wheel that is rotated to indexed positions. The rotating parts are contained within the base portion 202 and the cover 204.

Figure 6:
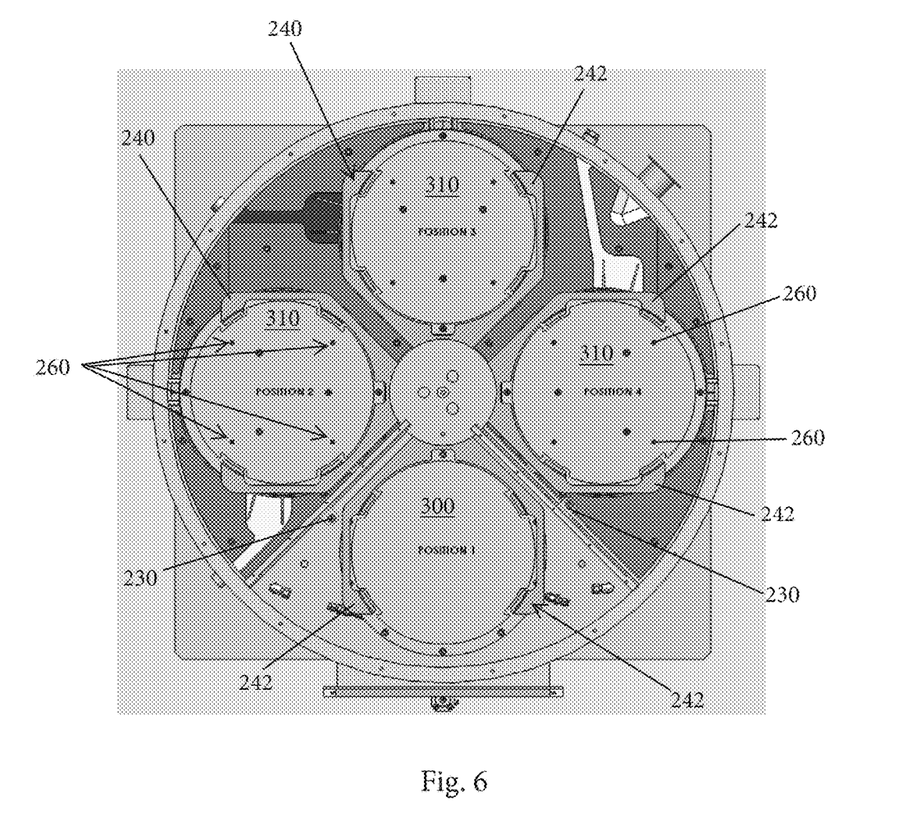
FIG. 6 is a top plan view of the flux reflow station with a top portion being hidden to allow various parts of the station to be seen.
Figure 7:
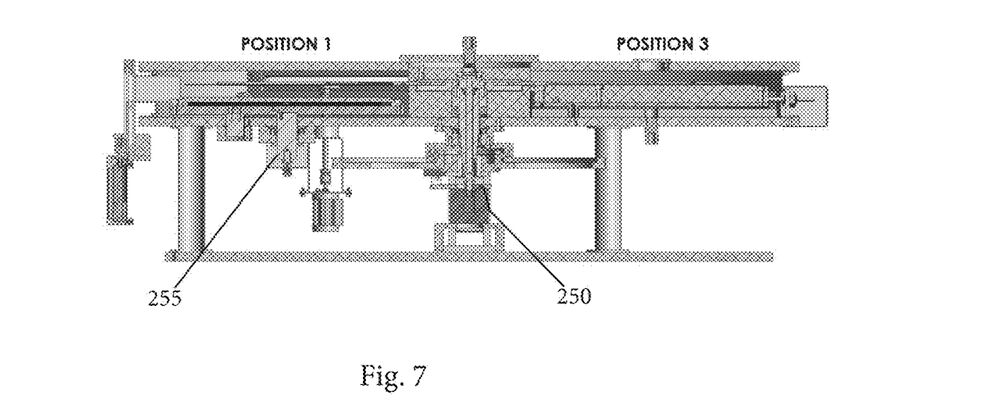
FIG. 7 is a right side cross-sectional view of the flux reflow station.
Figure 8:
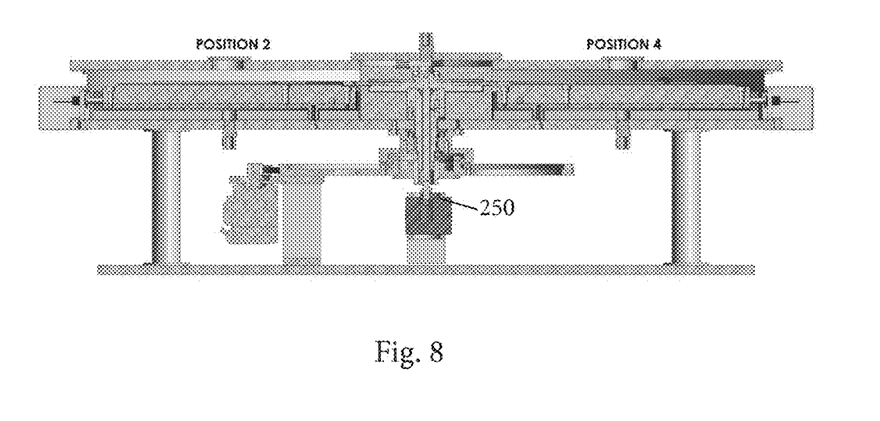
FIG. 8 is a front cross-sectional view of the flux reflow station.

First, a wafer 10 is moved into the device 200 (solder reflow oven) through a door 210 into position 1 as shown in FIG. 6. The door 210 provides an entrance into the interior of the device 200 to allow both loading and unloading of the wafers 10. The door 210 is openable and closeable and in the closed position, seals off the interior of the device 200. The door 210 can be part of an automated mechanism or can be manually operated. As illustrated, the device 200 can be in the form of a slit or slot sized to receive the wafer 10 from the robot 115. The base portion 202 includes a vertical peripheral wall 205 that extends around the periphery of the device 200. The open slit of the door 210 passes through the peripheral wall 205. The robot 115 thus feeds the wafer 10 through the slit into the interior of the device 200.

As shown in FIGS. 4 and 6, the interior of the device 200 is partitioned into a number of different wafer positions. For example, the device 200 can include four (4) positions as shown in FIG. 6. The four positions are labeled in FIGS. 4 and 6, a first position 220 (position 1), a second position 222 (position 2), a third position 224 (position 3), and a fourth position 226 (position 4), with each position being 90 degrees apart from one another in the circular shaped indexed device 200. The first position is located behind the door 210 and thus, the wafer 10 is initially introduced into the first position through the door 210 and ultimately, also exits through the door 210 from the first position.

The device 200 also includes a mechanism for sealing a first chamber 211 that is located behind the door 210 and which initially receives the substrate and from which the substrate (wafer) is discharged once the reflow is complete. In the first position 220, the wafer 10 is located within the first chamber 211 in select conditions, such as when the door 210 is being opened or closed. In particular, when the door 210 opens, the interior of the device 200 is open to atmosphere through the open door 210 and thus, the sealing mechanism is designed to seal off the first chamber 211 (first position 220) from the other positions 222, 224, 226 thereby preventing any air within the first chamber 211 from flowing into contact with a wafer (substrate) at any of the other positions 222, 224, 226. In the illustrated embodiment, the sealing mechanism is in the form of a pair of shutters 230 that serve to seal off the first chamber 211 from the rest of the interior of the device.

The shutters 230 can be in the form of structures that can be pivoted between an open position and a closed position. The shutters 230 can take any number of different forms so long as they perform the intended function. For example, the shutters 230 can alternatively be in the form of vertical walls that can be raised and lowered or otherwise moved to seal off the first chamber 211 from the rest of the interior.

One shutter (blade) 230 is thus located between the first and second positions, while the other shutter (blade) 230 is located between the first and fourth positions. The shutters 230 are controlled using conventional means, such as a motor that is controlled by a processor or the like. In the closed positions (active position), the shutters 230 seal off the first chamber 211, while in the open position, the shutters 230 permit the wafers 10 to freely move between the various positions, including from position one to position two and from position four to position one.

Before the door 210 is opened, the two shutters 230 are closed to protect positions two to four from the intrusion of oxygen (since air flows through the open door 210 and into the first chamber 211). Once the wafer 10 is inside the apparatus the door 210 is closed and the portion of the enclosure around position one is purged with nitrogen until the oxygen returns to an acceptable level. In other words, the first chamber 211 is purged with nitrogen. Once that oxygen level is reached the shutters 230 can be opened, allowing processing to continue. The wafer 10 in the position one is thus ready for processing once the purging is complete. Position one is thus the initial intake position and is the position in which the processing conditions are established (i.e., purging of air).

From position one, the wafer 10 is moved to position 2 by a substrate (wafer) support member/mechanism 240. The wafer support 240 is a structure on which the wafer 10 is supported and is movable between the four positions of the device 100. In the illustrated embodiment, there are four substrate supports 240 that can hold four wafers 10, one at each of the four positions of the device 100. In this configuration, the substrate supports 240 are located about 90 degrees from one another.

As shown, the substrate support 240 can have a U-shape defined by a pair of spaced fingers 242 with the wafer 10 being supported between the fingers 242. Along the inner edges of the fingers 242, the fingers 242 can have a number of protrusions as shown. The substrate (wafer) supports 240 thus represent spoke-like structures that extend radially outward from a central hub that is operatively connected to a motor or the like for advancing the substrate supports 240 in an indexed manner.

As mentioned herein, each of the stations can be associated with either a hot plate or a cold plate. However, it will be understood that other designs are envisioned in which a station does not include either plate type but includes some other type of cooling or heating mechanism. In the illustrated embodiment, the first station includes a cold plate 300 and each of the second, third and fourth positions includes a hot plate 310. The operation of the plates is described below and one will appreciate that the plates 300, 310 are positioned so not to interfere with the movement of the wafers 10 from station to station. The wafers 10 are thus supported above the plates 300, 310.

The wafer 10 thus extends between the fingers 242 and is supported thereon and therebetween. First, the wafer supports 240 are lifted up vertically as a unit by an air cylinder 250 or other type of mechanical device for controllable moving the wafer supports 240 (see FIG. 7). Then the wafer supports 240, again as a unit, are rotated clockwise by 90 degrees, such that the wafer 10 which began in position 1 is now in position 2. Please note that the apparatus could be made to rotate in the counter-clockwise direction just as easily, but for the sake of clarity we will assume clockwise rotation with regards to FIG. 6. Lastly the air cylinder 250 retracts, bringing the wafer supports 240 back down. This brings the wafer 10 to rest on pedestals 260 a small distance above the surface of the hot plate 310 in position 2 (see FIG. 8). The pedestals 260 are thus located above the hot plate 310 and the heights of the pedestals 260 are selected so as to create a predetermined distance between the wafer and the underlying hot plate 310.

The hot plates 310 each contains heating elements or is connected to a heat source which when activated begins to heat the plate 310. Similarly, the cold plate 300 contains cooling elements or is connected to a cooling source which when activated begins to cool the plate.

The hot plate 310 at position 2 is held at a constant temperature, and the close proximity with the wafer 10 acts to begin heating the wafer 10. While the first wafer 10 heats in position 2 a second wafer 10 can be loaded into position 1 in the manner described above. After a set time has elapsed, the air cylinder 250 again lifts the wafer supports 240. Then the substrate supports 240 are rotated clockwise by 90 degrees, and the air cylinder 250 retracts, lowering the wafer supports 240 and the wafers 10 back down. Thus the first wafer 10 has now been moved to position 3, where it is again held a small distance above the hot plate 310 by pedestals 260. Additionally, the second wafer 10 is now in position 2. The hot plate 310 in position 3 is kept at a constant temperature that is higher than the temperature of the hot plate 310 in position 2 so that the wafer 10 continues to heat once it arrives in position 3.

Once again an additional wafer 10 is inserted into position 1 while the first wafer 10 is in position 3. After the same amount of time has elapsed in position 3 as in position 2, the indexing process again repeats, moving the first wafer 10 from position 3 to position 4 and simultaneously advancing the other wafers 10 by one position. The hot plate 310 in position 4 is hotter than the hot plate 310 in position 3, thus the wafer 10 is further heated. Once more an additional wafer 10 is inserted at position 1 such that all four wafer supports 240 now hold a wafer 10.

The progressive increase in temperature as the wafer (substrate) is sequentially advanced to the positions 2 to 4 results in the optimal temperature profile being achieved.

When the set time has elapsed once more, the wafer (substrate) supports 240 are again raised up (e.g., by means of the air cylinder), rotated 90 degrees clockwise, and lowered back down. This brings the first wafer 10 back to position 1 and advances the other three wafers 10 by one position each. Once the first wafer 10, which has been heated in positions 2, 3, and 4 is brought back to position 1 the cold plate 300 that is at position 1 is moved into an operating position as, for example, being raised by an air cylinder 255, so that it is in contact with the bottom of this wafer 10 that is back at position 1. The cold plate 300 is configured such that it rapidly cools the wafer 10 that is in contact therewith so that it can be removed from the protective low oxygen environment. The cold plate 300 is thus cooled to a suitable cold temperate to accomplish such cooling.

Once the wafer 10 is sufficiently cool, the cylinder 255 retracts, moving the cold plate 300 back down out of the way, the shutters 230 are closed and then the door 210 is opened. Next the first wafer 10 is removed (e.g., as by the use of the robot 115), and another wafer 10 is put in the wafer support 240 previously occupied by the first wafer 10. Then the door 210 is closed and the portion of the enclosure (i.e., the first chamber 211) created by the two shutters 230 is purged with nitrogen to re-establish the required low oxygen environment. Once the target oxygen level is reached (e.g., as detected by a sensor that is in communication with a master controller), the shutters 230 are opened, allowing the wafer supports 240 to index again, thus moving all four wafers 10 along.

This process can then repeat continuously by removing and replacing one wafer 10 on each 90 degree rotation of the wafer supports 240. Thus, the apparatus is capable of processing 4 wafers 10 simultaneously and provided a fully automated process in which wafers 10 are loaded into the device 200 and are then unloaded after undergoing the desired processing. The wafer supports 240 are thus not only programmed to be advanced in an indexed manner but also, in the illustrated embodiment, are configured to be raised and lowered to increase the ease of travel of the substrate between the various positions without interfering with the hot plates and/or cold plate.

Figure 9:
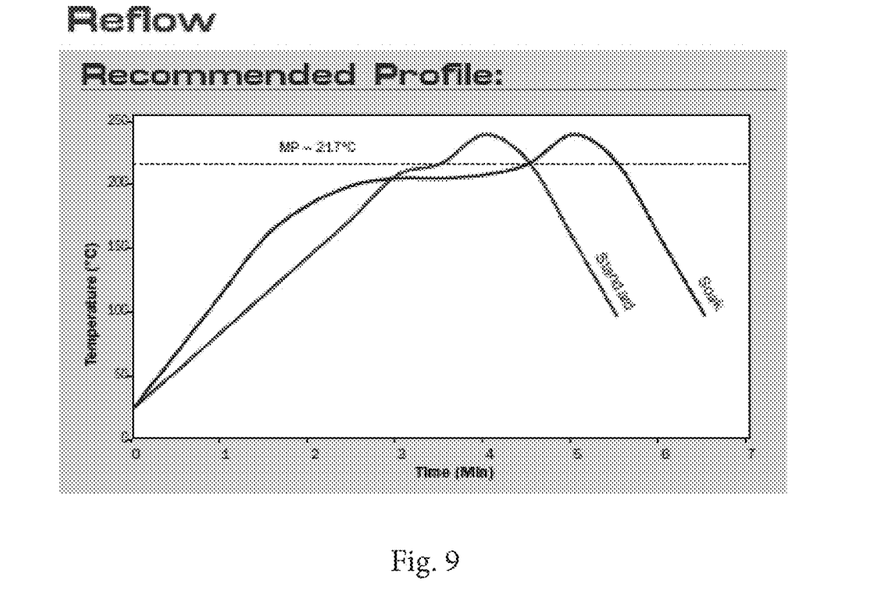
FIG. 9 is a graph showing an exemplary target reflow profile.
Figure 10:
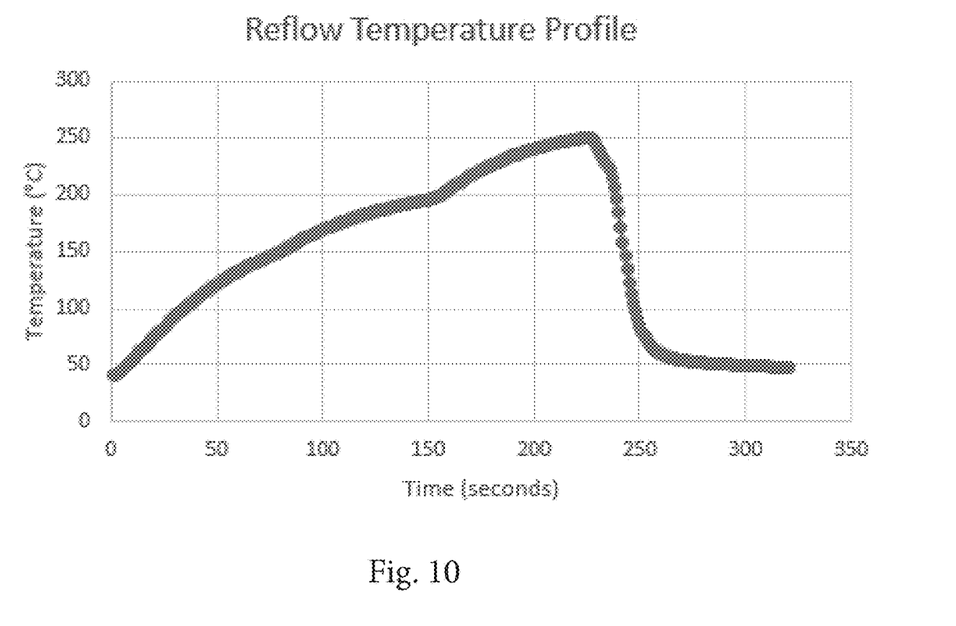
FIG. 10 is a graph showing a reflow profile obtained with the system of the present invention.

One exemplary recommended reflow profile is shown in FIG. 9. The actual reflow profile measured in the apparatus 200 according to one exemplary application is shown in FIG. 10.

Figure 11:
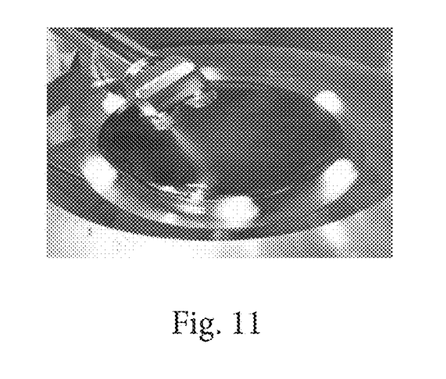
FIG. 11 is a top perspective view of a high pressure cleaning device.

After the wafer has cycled through the reflow station, the removal of the flux and cleaning of the substrate is done in the cleaning module at the third station 116. Heated deionized water is sprayed onto the substrate (wafer). High pressure can be used to assist in the cleaning process. FIG. 11 shows one such sprayer for cleaning the wafer. The addition of surfactants can also be included. The wafer 10 is given a final rinse and spin dry before being returned to the FOUP load port 117 and which location the wafer 10 is removed from the system 10.

While the present invention has been described above using specific embodiments, there are many variations and modifications that will be apparent to those having ordinary skill in the art. As such, the described embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claimed is:

1. A system for performing a solder reflow process comprising a plurality of stations within one system frame comprising:
    a first station for coating flux on a substrate;
    a second station for reflowing the flux on the substrate;
    a third station for removing the flux and cleaning the substrate; and
    an automated transfer device for transferring the substrate from one station to another station;
    wherein the second station includes a circular shaped reflow device that has multiple spaces to provide a temperature profile for reflowing the flux in a controlled low oxygen environment;
    wherein the reflow device includes a housing that defines a hollow interior, the housing including a door for both loading and unloading the substrate from the reflow device, the housing being divided into a first substrate space in which the substrate is in a first position; a second substrate space in which the substrate is in a second position; third substrate space in which the substrate is in a third position; and a fourth substrate space in which the substrate is in a fourth position, wherein the first substrate space is located behind the door such that the first position defines an initial loading and unloading position;
    wherein the first substrate space is selectively sealed off from the second, third and fourth substrates spaces with a controllable mechanism to prevent air from flowing between the first substrate space and the other substrate spaces; and
    wherein the controllable mechanism comprises a pair of shutters that move between open and closed positions, wherein in the closed position, the shutters seal the first substrate space from the rest of the interior of the housing, thereby allowing the door to be opened or closed without introducing air into the rest of the interior including the other substrate spaces.

2. The system of claim 1, wherein the first station includes one or more first devices for coating the flux; the second station includes one or more second devices for reflowing the flux and the third stations includes one or more third devices for removing the flux and cleaning the substrate; and the automated transfer device comprises a single robot.

3. The system of claim 2, wherein the first devices are arranged in a stacked manner at the first station, the second devices are arranged in a stacked manner at the second station, and the third devices are arranged in a stacked manner at the third station.

4. The system of claim 1, wherein the reflow device is automated such that the substrate is advanced into each of the spaces and is held thereat for a predetermined period of time to effectuate reflow of the flux.

5. The system of claim 4, wherein the multiple spaces includes at least one space for heating the substrate and at least one space for cooling the substrate.

6. The system of claim 5, wherein there are two or more spaces for heating the substrate and a single space for cooling the substrate.

7. The system of claim 4, wherein the reflow device is an automated indexed device.

8. The system of claim 1, wherein the system is configured such that after loading a substrate through the open door into the first substrate space, a purging step is performed to create a low oxygen environment in the first substrate space which is sealed off due to the shutters being in the closed positions.

9. The system of claim 1, further including one substrate support that for each of the first, second, third and fourth substrate spaces, the substrate support being connected to one another such that all of the substrate supports are part of an automated device and all move in unison, each substrate support being configured to hold one substrate.

10. The system of claim 9, wherein the substrate supports are connected a common central hub that is rotatably driven so as to index the substrate supports from one position to a next position.

11. The system of claim 10, wherein the substrate supports are operatively connected to an actuator that allows each substrate support to move between a raised position and a lowered position.

12. The system of claim 11, wherein the actuator comprises a pneumatic cylinder.

13. The system of claim 9, wherein the first space being a cooling zone, while, the second, third and fourth spaces comprise heating zones.

14. The system of claim 13, further including a cold plate disposed in the first substrate space,
a first hot plate disposed in the second substrate space,
a second hot plate disposed in the third substrate space, and
a third hot plate disposed in the fourth substrate space,
the substrate supports being disposed above the cold and hot plates and operatively connected to an actuator that allows each substrate support to move between a raised position and a lowered position relative to the underlying cold and hot plates and be advanced from one position to the next position.

15. The system of claim 14, further including pedestals that extend upwardly above a top surface of each hot plate for supporting and suspending the substrate a prescribed distance above the hot plate.

16. The system of claim 14, wherein the cold plate is operatively connected to a mechanism that permits the cold plate to be moved between a raised position and a lowered position, wherein in the raised position, the cold plate is in contact with the substrate being held by the substrate support in the first position for rapid cooling thereof and in the lowered position, the substrate supports can freely move in an indexed manner above each of the cold and hot plates.

17. The system of claim 14, wherein the first hot plate is heated to a first temperature, the second hot plate is heated to a second temperature and the third hot plate is heated to a third temperature, wherein the first temperature<the second temperature<the third temperature.

* * * * *